(12) United States Patent
Oogi et al.

(10) Patent No.: US 8,551,385 B2
(45) Date of Patent: Oct. 8, 2013

(54) RESIN MOLDING APPARATUS, RESIN MOLDING METHOD, AND RESIN CONTAINER

(75) Inventors: Kazuyuki Oogi, Chiba (JP); Sadaki Yamamoto, Chiba (JP); Masanobu Sato, Tokyo (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 190 days.

(21) Appl. No.: 13/054,672

(22) PCT Filed: Jul. 21, 2009

(86) PCT No.: PCT/JP2009/003393
§ 371 (c)(1),
(2), (4) Date: Jan. 18, 2011

(87) PCT Pub. No.: WO2010/010682
PCT Pub. Date: Jan. 28, 2010

(65) Prior Publication Data
US 2011/0114653 A1 May 19, 2011

(30) Foreign Application Priority Data

Jul. 23, 2008 (JP) ................................. 2008-190240

(51) Int. Cl.
*B29C 45/14* (2006.01)

(52) U.S. Cl.
USPC ............. 264/275; 264/277; 264/279; 215/40; 215/44

(58) Field of Classification Search
USPC ........................ 264/275, 278, 279
See application file for complete search history.

(56) References Cited

U.S. PATENT DOCUMENTS 1,712,499 A * 5/1929 Jaeger .............................. 65/238
2,337,998 A * 12/1943 Karoff .......................... 264/279
(Continued)

FOREIGN PATENT DOCUMENTS

CN 87101758 9/1987
CN 1209784 3/1999
(Continued)

OTHER PUBLICATIONS

International Search Report Dated Sep. 1, 2009.
(Continued)

*Primary Examiner* — Anthony Stashick
*Assistant Examiner* — Chetan Chandra
(74) *Attorney, Agent, or Firm* — Rankin, Hill & Clark LLP

(57) ABSTRACT

A resin molding apparatus of a simplified structure is provided that offers high handling efficiency by a work robot, thereby improving a throughput. The resin molding apparatus (200) that retains a hollow molded body (10) including a closed-bottom cylindrical main body (12) and a cylindrical open neck portion (20), the open neck portion (20) including a helical ridge portion (22) formed on an outer circumferential surface thereof and divided into a plurality of helical segments by a slit (24) extending in an axial direction of the open neck portion (20), and that overmolds a resin sheathing body (30) on an outer surface of the main body (12), includes a first recess in which the open neck portion (20) is to be fitted, and a rib (216) formed on a circumferential surface of the recess so as to extend in a depthwise direction thereof, and to be engaged with the slit (24).

2 Claims, 11 Drawing Sheets

(56) References Cited

U.S. PATENT DOCUMENTS

| | | | |
|---|---|---|---|
| 3,037,652 A * | 6/1962 | Wallace | 215/12.2 |
| 3,663,259 A * | 5/1972 | Barriere | 215/12.2 |
| 3,719,735 A * | 3/1973 | Valyi | 264/513 |
| 3,792,140 A * | 2/1974 | Schiemann | 264/514 |
| 3,881,622 A * | 5/1975 | Dockery | 215/44 |
| 4,727,997 A | 3/1988 | Nakamura et al. | |
| 5,089,208 A | 2/1992 | Nakamura et al. | |
| 5,501,322 A * | 3/1996 | Drebushenko | 206/151 |
| 5,711,913 A * | 1/1998 | Seki et al. | 264/532 |
| 5,850,681 A | 12/1998 | La Barre | |
| 6,006,930 A * | 12/1999 | Dreyer et al. | 215/44 |
| RE38,396 E * | 1/2004 | Gellert | 29/411 |
| 6,846,443 B1 * | 1/2005 | Jackson et al. | 264/242 |
| 7,097,056 B2 * | 8/2006 | Ozawa et al. | 215/44 |
| 7,291,302 B2 * | 11/2007 | Koyama et al. | 264/255 |
| 7,569,171 B2 * | 8/2009 | Dieudonat et al. | 264/275 |
| 7,887,731 B2 * | 2/2011 | Schmeisser et al. | 264/255 |
| 7,988,897 B2 * | 8/2011 | Yamamoto et al. | 264/275 |
| 8,097,199 B2 * | 1/2012 | Abbott et al. | 264/272.15 |
| 8,360,952 B2 * | 1/2013 | Wissman et al. | 600/7 |
| 8,430,258 B2 * | 4/2013 | Yamamoto et al. | 220/62.22 |
| 2001/0027978 A1 * | 10/2001 | Finlay et al. | 220/669 |
| 2002/0175136 A1 * | 11/2002 | Bouix et al. | 215/12.2 |
| 2003/0020193 A1 | 1/2003 | Hamamoto et al. | |
| 2005/0150856 A1 * | 7/2005 | Ozawa et al. | 215/44 |
| 2006/0138071 A1 * | 6/2006 | Tsutsumi et al. | 215/252 |
| 2010/0000963 A1 * | 1/2010 | Inomata et al. | 215/383 |
| 2010/0276387 A1 * | 11/2010 | Hamana et al. | 215/330 |
| 2011/0114653 A1 * | 5/2011 | Oogi et al. | 220/675 |

FOREIGN PATENT DOCUMENTS

| | | |
|---|---|---|
| CN | 1447765 | 10/2003 |
| CN | 1787951 | 6/2006 |
| EP | 228662 A2 * | 7/1987 |
| JP | U50-043063 | 5/1975 |
| JP | 8-510183 | 10/1996 |
| JP | 2001-310374 | 11/2001 |
| JP | 2003-39533 | 2/2003 |
| JP | 2010042685 A * | 2/2010 |
| KR | 10-340300 | 11/2002 |
| WO | 2007/127789 | 11/2007 |
| WO | 2008/010597 | 1/2008 |
| WO | 2008/010600 | 1/2008 |

OTHER PUBLICATIONS

Chinese Patent Office Action issued on Jan. 16, 2013 filed in the corresponding Chinese patent application No. 200980126221.0.
European Search Report Dated Oct. 5, 2011.

* cited by examiner (a)

(b)

(a)

(b)

RESIN MOLDING APPARATUS, RESIN MOLDING METHOD, AND RESIN CONTAINER

TECHNICAL FIELD

The present invention relates to a resin molding apparatus, a resin molding method, and to a resin container.

BACKGROUND ART

To store a liquid having fluidity such as a cosmetic liquid, a chemical, or a beverage, a resin container formed through injecting a molten resin over an outer surface of a hollow molded body (inner shell) made of a resin, thus overmolding a resin sheathing body (outer shell), has been proposed (see, for example, patent documents 1, 2 cited below). For such a resin container, different materials can be employed for each of the inner shell and the outer shell, which facilitates manufacturing a container suitable for the characteristic of the liquid to be stored therein, for example employing a corrosion resistant material for the inner shell and a mechanically strong material for the outer shell.

Now, for overmolding the resin sheathing body over the outer surface of the hollow molded body, it is necessary to minimize wobbling of the hollow molded body with respect to the molding die. Also, in the case where both of the hollow molded body and the resin sheathing body are of a square bottle shape, or respectively ornamented in a specific manner, the hollow molded body has to be oriented in a predetermined direction with respect to the molding die, in the overmolding process.

In this aspect, the resin molding method according to the foregoing documents 1 and 2 includes forming a screw thread on an open neck portion of the hollow molded body and the molding die in advance, and screwing them together thus fixing the hollow molded body to the molding die, before executing the overmolding.

[Patent Document 1]
 International Publication No. 2008/010597 pamphlet
[Patent Document 2]
 International Publication No. 2008/010600 pamphlet

DISCLOSURE OF THE INVENTION

According to the resin molding method disclosed in the foregoing patent documents, however, the hollow molded body or the resin container formed by molding has to be rotated, so as to screw the open neck portion into or out of the die, for attaching or removing the hollow molded body to or from the molding die. Besides, the position of the thread on the open neck portion of the hollow molded body, and the screwing torque are subject to a predetermined tolerance, and therefore an exclusive detector has to be employed for improving angular accuracy and reproducibility of the state where the hollow molded body is mounted on the molding die. Accordingly, there has still been a room for improvement from the viewpoint of upgrading a throughput by full automation of the overmolding process utilizing the molding die and a work robot.

The present invention has been accomplished in view of the foregoing situation, and provides a resin molding apparatus having a simplified structure that offers high handling efficiency by a work robot thereby improving a throughput, as well as a resin molding method and a resin container.

According to the present invention, there is provided a resin molding apparatus that retains a hollow molded body including a closed-bottom cylindrical main body and a cylindrical open neck portion, the open neck portion including a helical ridge portion formed on an outer circumferential surface thereof and divided into a plurality of helical segments by a slit extending in an axial direction of the open neck portion, and that overmolds a resin sheathing body on an outer surface of the main body, comprising:
 a recess in which the open neck portion is to be fitted; and
 a rib formed on a circumferential surface of the recess so as to extend in a depthwise direction thereof, and to be engaged with the slit.

In a more specific aspect of the resin molding apparatus according to the present invention, a plurality of the ribs may be formed at irregular intervals on the circumferential surface of the recess, the circumferential surface may include a longer circumferential region, and a shorter circumferential region where an interval between adjacent the ribs is narrower than an interval between adjacent ribs in the longer circumferential region; and
 an angle defined by the circumferential surface and a lateral face of the ribs located on the respective sides of the longer circumferential region may be smaller than an angle defined by the circumferential surface and a lateral face of the ribs located on the respective sides of the shorter circumferential region.

In a more specific aspect of the resin molding apparatus according to the present invention, in the case where the rib located between the longer circumferential region and the shorter circumferential region is engaged with the slit, a clearance between a base portion of the lateral face of the rib on the side of the longer circumferential region and the helical segments may be larger than a clearance between a base portion of the lateral face of the same rib on the side of the shorter circumferential region and the helical segments.

In a more specific aspect of the resin molding apparatus according to the present invention, a plurality of the ribs may be symmetrically located with respect to a symmetry plane passing a center of the recess; and
 each lateral face of the ribs may be formed so as to extend toward the symmetry plane.

In a more specific aspect, the resin molding apparatus according to the present invention may further include an outer die that covers the main body of the hollow molded body retained; and
 a location of the slit to be set may be variable with respect to the outer die, in a circumferential direction of the recess.

In a more specific aspect, the resin molding apparatus according to the present invention may further include a flow channel communicating between an internal region and an external region of the recess, and a fluid supplier that supplies a fluid into the hollow molded body fitted to the recess, through the flow channel.

According to the present invention, there is provided a method of molding a resin over a hollow molded body including a closed-bottom cylindrical main body and a cylindrical open neck portion, the open neck portion including a helical ridge portion formed on an outer circumferential surface thereof and divided into a plurality of helical segments by a slit extending in an axial direction of the open neck portion, the method including overmolding a resin sheathing body over an outer surface of the main body, comprising:
 retaining the hollow molded body by engaging the slit with an engagement piece; and
 overmolding a molten resin over the hollow molded body thus retained.

In a more specific aspect of the resin molding method according to the present invention, the process of retaining the hollow molded body may include directing the open neck portion downward in the gravity direction.

In a more specific aspect, the resin molding method according to the present invention may include executing the overmolding over the hollow molded body in which the helical segments include a longer helical segment, and a shorter helical segment shorter than the longer helical segment in a circumferential direction of the open neck portion; and the process of retaining the hollow molded body may include engaging the slit with the engagement piece such that a clearance between an end portion of the longer helical segment and the engagement piece becomes larger than a clearance between an end portion of the shorter helical segment and the engagement piece.

According to the present invention, there is provided a resin container comprising a hollow molded body including a closed-bottom cylindrical main body and a cylindrical open neck portion with a helical ridge portion formed on an outer circumferential surface thereof; and a resin sheathing body formed integrally with the hollow molded body on an outer surface of the main body;

wherein the open neck portion includes a slit extending in an axial direction so as to divide the ridge portion into a plurality of helical segments.

In a more specific aspect, the resin container according to the present invention may further include a cap to be screwed onto the open neck portion to thereby tightly seal the hollow molded body; and the cap may include a threaded portion continuously formed at least in one entire loop, for screw engagement with the plurality of helical segments.

In a more specific aspect of the resin container according to the present invention, the helical segments may include a longer helical segment, and a shorter helical segment whose length in a circumferential direction of the open neck portion is shorter than the length in the longer helical segment in a circumferential direction of the open neck portion; and an angle in which respective end portions of the longer helical segment in a circumferential direction rise from the circumferential surface of the open neck portion may be steeper than an angle in which respective end portions of the shorter helical segment in a circumferential direction rise from the circumferential surface of the open neck portion.

It is to be noted that the resin molding apparatus according to the present invention includes, in addition to a fitting, a jig, a mounting device and a die that may be employed for the overmolding process, a supplier of a resin or another material, a handling device, a control unit and so forth, and also a combination of a part or all of the mentioned constituents. Accordingly, the scope of the resin molding apparatus according to the present invention includes an independent element of the fitting and jig that retains the hollow molded body, a combination of such fitting and the die, a combination of those and an injection unit, and so forth.

Also, the "cylindrical shape" of the open neck portion refers to a state where an entirety of the open neck portion or a part of the front end portion thereof has a generally circular cross-sectional shape or is of a generally circular cylindrical shape. The axis along which the open neck portion extends may be linear or curved, and the cross-sectional shape does not have to be a geometrically perfect circle.

Also, the expression that the slit extends in an axial direction of the open neck portion refers to a structure in which the ridge portion includes a cutaway portion located along a helical axis thereof. Here, the extending direction of the slit does not have to strictly agree with the axial direction of the open neck portion.

Further, the cut depth of the slit is not specifically limited, and may be larger or smaller than the height of the ridge portion. In other words, the bottom portion of the slit may be flush with the circumferential surface of the open neck portion, or may be made deeper than the circumferential surface of the open neck portion so as to completely split the ridge portion into the plurality of helical segments. Alternatively, the bottom portion of the slit may be located at a higher level than the circumferential surface of the open neck portion, so that the slit divides the ridge portion halfway in a heightwise direction thereof. Thus, the height of the helical segments from the bottom portion of the slit may be the same as or different from the height of the ridge portion with reference to the circumferential surface of the open neck portion.

Therefore, the expression that the ridge portion is divided into the plurality of helical segments by the slit includes, in addition to the state where the ridge portion is completely divided into the individual helical segments, a partially divided state where the ridge portion remains continuous, with portions of different heights formed in a combteeth shape.

According to the present invention, the fluid refers to a material having fluidity such as a gas or a liquid, and includes a liquid, a paste, and a mixture thereof with a powder or a gel.

Here, the constituents of the present invention do not always have to be individually independent, but may be arranged such that a plurality of constituents constitutes a unified member; a plurality of members constitutes a constituent; a constituent is a part of another constituent; a part of a constituent also serves as a part of another constituent; or the like.

The resin molding apparatus, the resin molding method and the resin container according to the present invention allow, since the helical ridge portion formed on the open neck portion is divided by the slit extending in the axial direction, the slit to serve as a key groove for fixing the hollow molded body to the molding die. Such arrangement eliminates the need to rotate the hollow molded body to fit the open neck portion to the die, and also enables the orientation of the hollow molded body with respect to the molding die to be determined with high reproducibility. Consequently, the throughput of the overmolding process can be improved.

Also, according to the present invention the helical segment can be suppressed from digging into the rib of the resin molding apparatus even in the case where the open neck portion of the hollow molded body has thermally expanded by the heat of the molten resin, and therefore the throughput of the overmolding process can be further improved. Such advantage will be described further with reference to embodiments to be subsequently described.

BRIEF DESCRIPTION OF THE DRAWINGS

The above and other objects, features and advantages will become more apparent through preferred embodiments described hereunder and the accompanying drawings specified below.

BEST MODE FOR CARRYING OUT THE INVENTION

Figure 1:
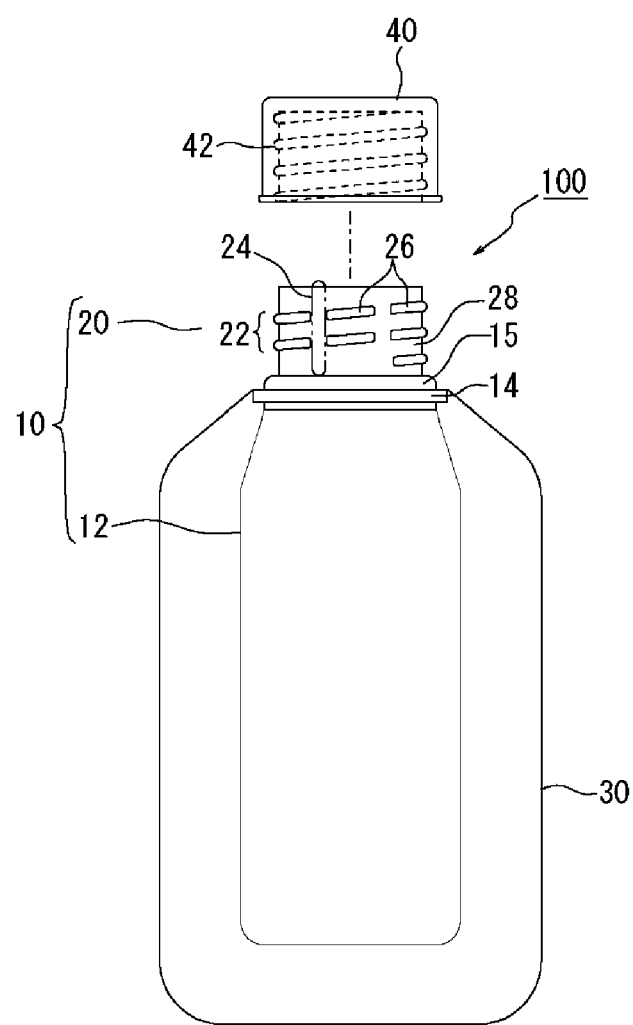
FIG. 1 is a schematic front view showing an example of a resin container according to an embodiment of the present invention.

Hereunder, embodiments of the present invention will be described referring to the drawings. In all the drawings, the same constituents will be given the same numeral, and the description thereof will not be repeated.

[Resin Container]

First, an outline of a resin container 100 according to this embodiment will be described. The resin container 100 is manufactured by a resin molding apparatus 200, through an overmolding method according to a resin molding method to be subsequently described.

FIG. 1 is a schematic front view showing an example of the resin container 100 according this embodiment.

FIG. 2(a) is a schematic plan view of a hollow molded body 10 employed as an inner shell according to this embodiment, and FIG. 2(b) is a front view thereof.

The resin container 100 includes a hollow molded body 10 including a closed-bottom cylindrical main body 12, a cylindrical open neck portion 20 with a helical ridge portion 22 formed around an outer surface thereof, and a resin sheathing body 30 formed integrally with the hollow molded body 10 over an outer surface of the main body 12.

The resin container 100 also includes a slit 24 formed on the open neck portion 20 so as to extend in an axial direction thereof, and to divide the ridge portion 22 into a plurality of helical segments 26.

The resin container 100 according to this embodiment will be described in further details.

In the hollow molded body 10, a content can be stored in the main body 12 and the open neck portion 20. The content is not specifically limited but may be any of a liquid, a gas, and a solid material, examples of which include a cosmetic liquid, a chemical, and a beverage.

On the open neck portion 20, of a cylindrical shape smaller in diameter than the main body 12, the helical ridge portion 22 is provided in a plurality of turns. The number of turns of the ridge portion 22 may be optionally determined, but typically 2 to 3 turns.

Figure 2:
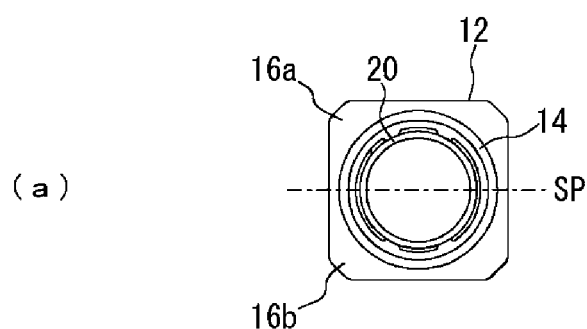
FIGS. 2(a) and 2(b) are a schematic plan view and a front view, respectively, of a hollow molded body.
Figure 2:
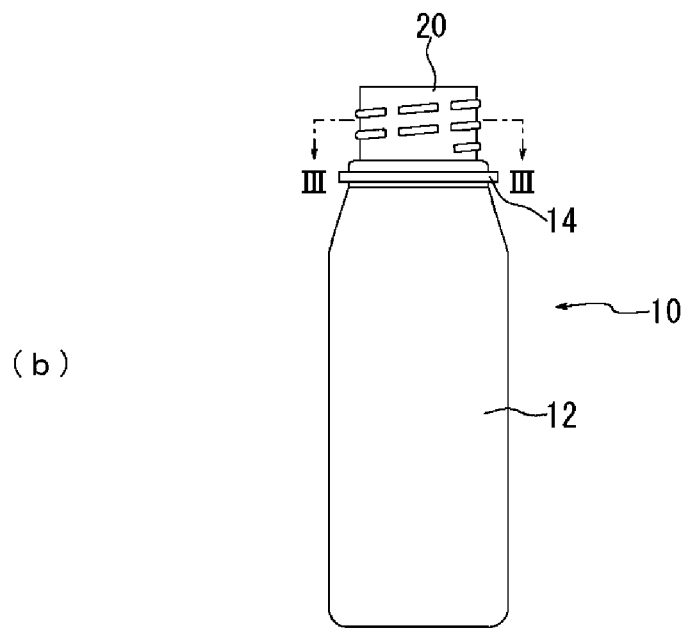

As shown in FIGS. 1 to 2(b), each loop of the ridge portion 22 is divided into four helical segments 26 by four slits 24.

In other words, the slit 24 intersects with the helical ridge portion 22 in a direction of a helical axis thereof. The slits 24 according to this embodiment all linearly extend in an axial direction of the open neck portion 20.

Here, the number of slits 24 provided on the open neck portion 20 may be three or fewer or five or more, other than four.

The slit 24 according to this embodiment constitutes a region where the ridge portion 22 is absent, extending in an axial direction of the open neck portion 20 (vertical direction based on the orientation of FIG. 1). A bottom portion of the slit 24 is flush with the circumferential surface of the open neck portion 20 (neck circumferential surface 28).

Conversely, the plurality of helical segments 26 is discontinuously formed on the neck circumferential surface 28 with an interval between each other, and thus constitutes the ridge portion 22. The helical segments 26 are disposed so as to regularly repeat in the same length in a circumferential direction of the open neck portion 20, and an interval between the adjacent helical segments 26 is aligned in an axial direction, thus to constitute the slit 24.

The resin container 100 further includes a cap 40 to be screwed onto the open neck portion 20 so as to tightly seal the hollow molded body 10.

The cap 40 includes a threaded portion 42 formed at least in one entire loop so as to be screw-engaged with the plurality of helical segments 26.

In this embodiment, the cap 40 is of a closed-bottom cylindrical shape, and attached to the outer surface of the open neck portion 20. The threaded portion 42 of the cap 40 is continuously formed on an inner circumferential surface of the cylindrical shape, for engagement with the ridge portion 22. Thus, the threaded portion 42 of the cap 40 does not include a slit corresponding to the slit 24 of the ridge portion 22, and the threaded portion 42 becomes engaged with all the helical segments 26, upon fixing the cap 40 onto the open neck portion 20.

The resin sheathing body 30 tightly covers the main body 12 of the hollow molded body 10, and serves to add an aesthetic value and mechanical strength to the resin container 100.

The resin sheathing body 30 is formed by overmolding a highly transparent synthetic resin over the hollow molded body 10. Examples of the material include an ionomer resin, an acrylic resin, a polyester resin, and a styrene-based resin such as a styrene-acrylonitrile copolymer resin, among which the ionomer resin and the polyester resin are preferable, the ionomer resin being more preferable. Practically, it is preferable to select the resin from the viewpoint of shock resistance, transparency, aesthetic value, and so forth.

The ionomer resin may be exemplified by an ethylene-unsaturated carboxylic acid copolymer containing 1 to 40 wt % of unsaturated carboxylic acid, with at least a part of its carboxylic group neutralized by a metal ion.

The ethylene-unsaturated carboxylic acid copolymer serving as a base for the ionomer resin may be obtained through copolymerization of ethylene and unsaturated carboxylic acid, and also another optional polar monomer.

The metal ion may be exemplified by those having a valence of 1 to 3, and in particular those in the IA, IIA, IIIA, IVA, and III columns of the periodic table of the elements and having a valence of 1 to 3.

The hollow molded body 10 according to this embodiment is constituted of a resin material such as polyolefin, polyester or polyamide, and a transparent synthetic resin is preferably employed from the viewpoint of visibility of the content. Specific materials may be appropriately selected from the viewpoint of heat resistance, shock resistance, corrosion resistance, ornamental value, aesthetic value, and so forth. For example, in the case where a high melting point is required it is preferable to employ polyester or polyamide, and in the case where corrosion resistance is important it is preferable to employ polyethylene, polypropylene or the ionomer resin. A light reflection powder may be mixed in the resin material, so as to upgrade the aesthetic value of the resin container 100. Alternatively, a mineral material such as glass or a metal material may be employed for the hollow molded body 10.

The shape and size of the hollow molded body 10 is not specifically limited, and in this embodiment the main body 12 has a square cross-section and an upper portion thereof extending toward the open neck portion 20, which has a circular cross-section, is formed in a tapered shape where the diameter is gradually reduced. Between the main body 12 and the open neck portion 20, a flange portion 14 is formed, on an upper face of which a boss 15 is provided for reinforcement of the flange portion 14 and the open neck portion 20.

The hollow molded body 10 according to this embodiment constituted of a resin is formed through a blow molding process. Alternatively, pieces of a shape divided in half of the hollow molded body 10 may be injection-molded, and then the half pieces may be vibration-welded together. To be more specific, the hollow molded body 10 is generally symmetrical with respect to an imaginary splitting plane SP, and therefore two half pieces 16a and 16b may be vibration-welded into the hollow shape.

Naturally, another molding method may be employed to form the hollow molded body 10, instead of the blow molding process and the vibration welding method.

Also, an ornamental element may be provided on a surface of the hollow molded body 10.

A material of the cap 40 may be the same as or different from the material of the hollow molded body 10.

Figure 3:
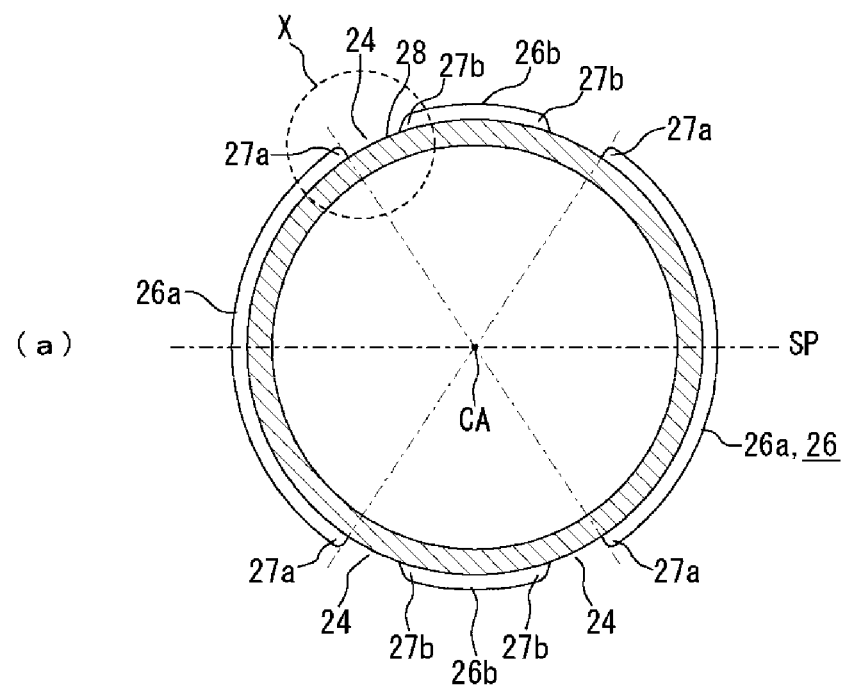
FIG. 3(a) is a cross-sectional view taken along a line III-III in FIG. 2(b)
FIG. 3(b) is an enlarged view of a portion indicated by a circle X in FIG. 3(a)
Figure 3:
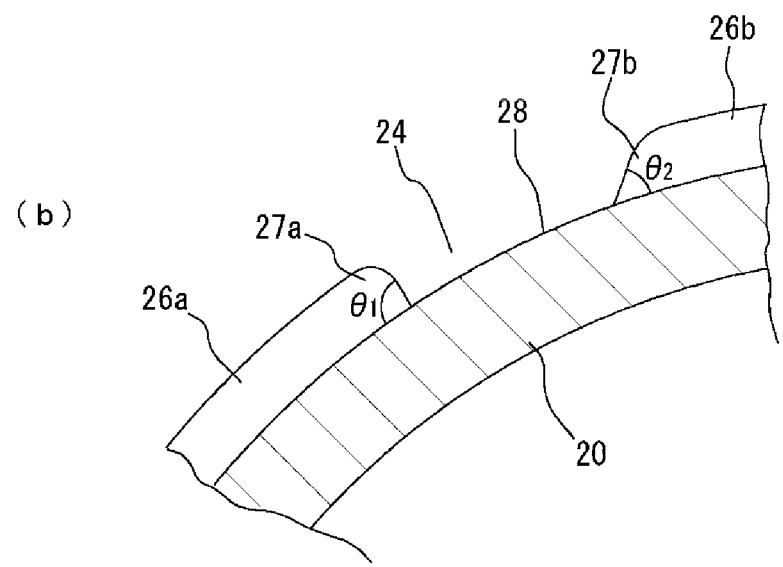

FIG. 3(a) is a cross-sectional view taken along a line III-III in FIG. 2(b). On the neck circumferential surface 28, the plurality of helical segments 26 is formed in a convex shape with an interval therebetween in a circumferential direction, and the slit 24 is formed through between the helical segments 26. FIG. 3(b) is an enlarged view of a portion indicated by a circle X in FIG. 3(a).

The helical segments 26 according to this embodiment include a longer helical segment 26a, and a shorter helical segment 26b shorter than the longer helical segment 26a in the circumferential direction of the open neck portion 20.

An angle in which the respective end portions of the longer helical segment 26a in a circumferential direction rise from the neck circumferential surface 28 is steeper than an angle in which the respective end portions of the shorter helical segment 26b in a circumferential direction rise from the neck circumferential surface 28.

In other words, in the cross-section of the open neck portion 20, the angle $\theta_1$ defined by the end portion 27a of the longer helical segment 26a in the circumferential direction and the neck circumferential surface 28 is larger than the angle $\theta_2$ defined by the end portion 27b of the shorter helical segment 26b in the circumferential direction and the neck circumferential surface 28, as shown in FIG. 3(b).

More specifically, while the end portion 27a of the longer helical segment 26a rises relatively steeply along a radial line of the open neck portion 20, the end portion 27b of the shorter helical segment 26b rises relatively gently, away from the radial line and toward a circumferential line of the neck circumferential surface 28.

On the open neck portion 20, at least a pair of shorter helical segments 26b are provided so as to oppose across the open neck portion 20.

In this embodiment, a pair of shorter helical segments 26b, 26b are symmetrically located with respect to the imaginary splitting plane SP of the hollow molded body 10, so as to oppose each other.

Normally, the hollow molded body 10 is made through a blow molding process. However, in the case of vibration-welding the half pieces 16a, 16b along the imaginary splitting plane SP thereby forming the hollow molded body 10, forming the respective end portions of the shorter helical segment 26b in the circumferential direction (end portion 27b) in a gentle slope prevents an undercut portion from being produced in the helical segment 26, in the process of molding the half pieces 16a, 16b.

[Resin Molding Apparatus]

Figure 4:
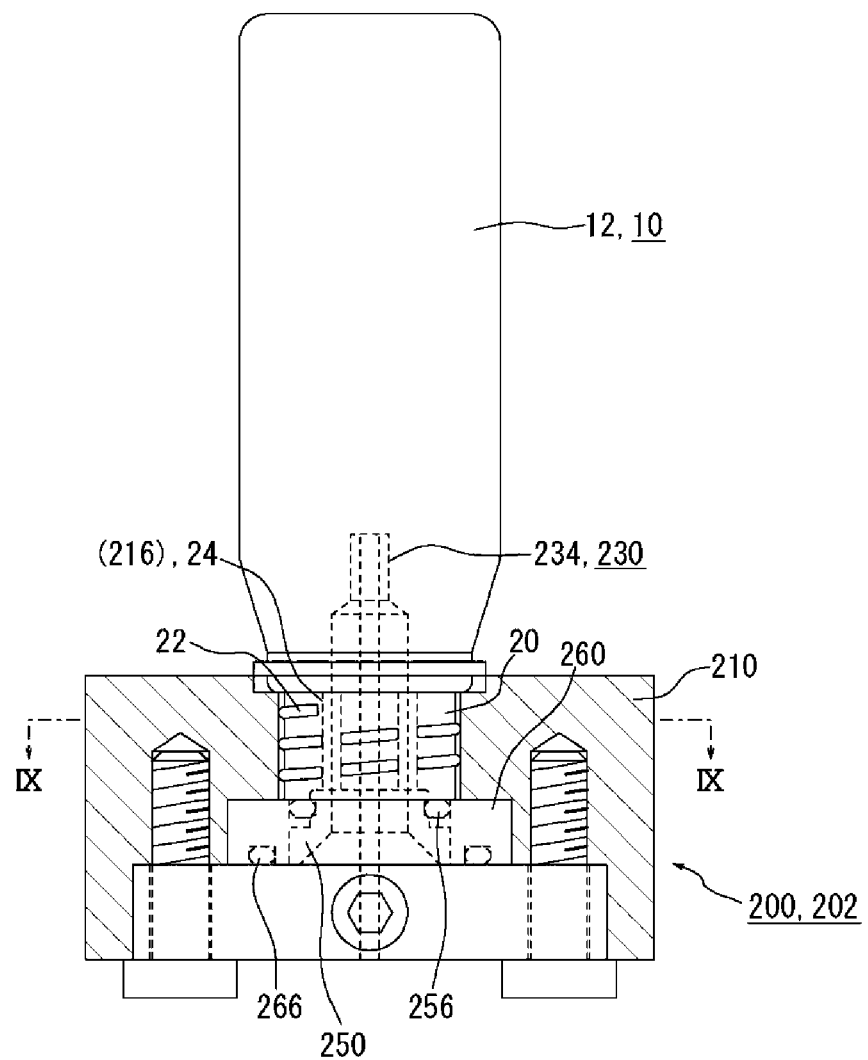
FIG. 4 is a schematic vertical cross-sectional view of an neck molding die, a part of a resin molding apparatus according to the embodiment, with the hollow molded body mounted thereon.

FIG. 4 is a schematic vertical cross-sectional view of an neck molding die 202, a part of a resin molding apparatus 200 according to the embodiment, with the hollow molded body 10 mounted thereon.

Figure 5:
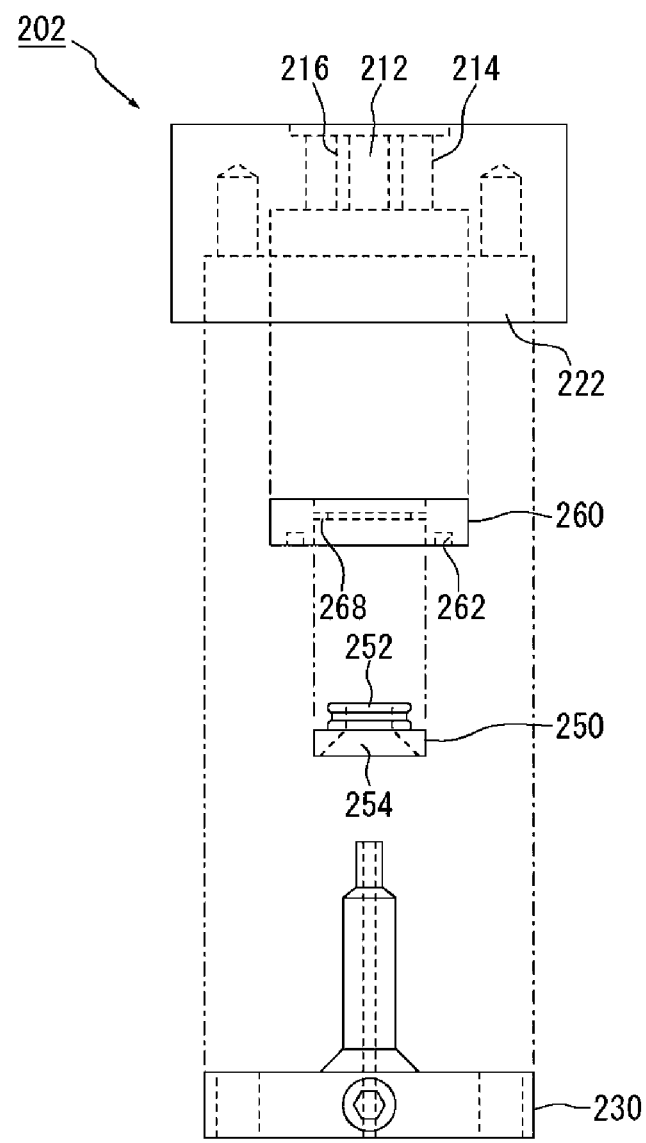
FIG. 5 is an exploded side view of the neck molding die.

FIG. 5 is an exploded side view of the neck molding die 202. The neck molding die 202 according to this embodiment serves as a jig that holds the hollow molded body 10, and is constituted of a combination of a frame body 210, a nozzle unit 230, a closer 250, and a holder 260.

Figure 6:
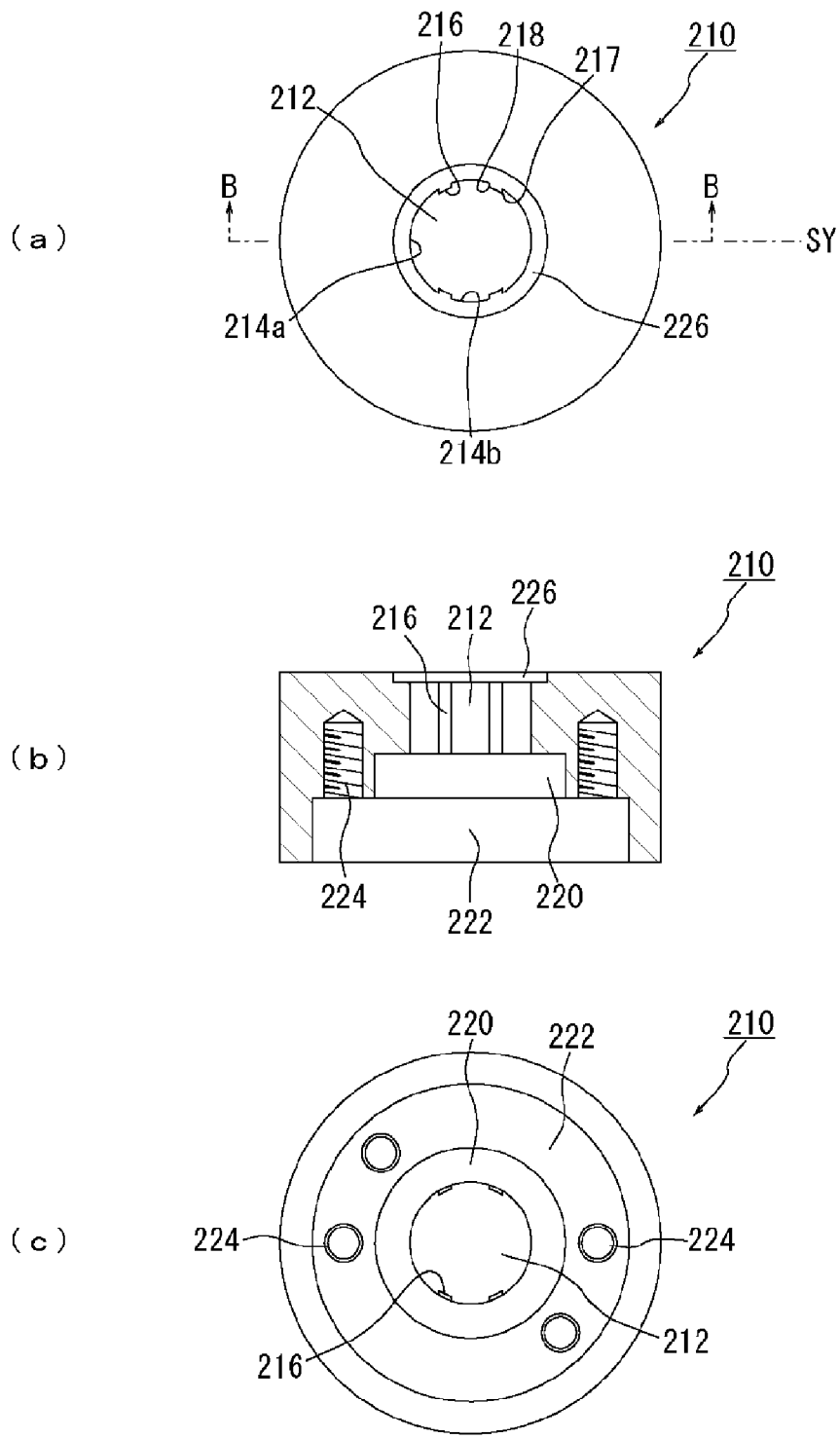
FIGS. 6(a) to 6(c) are three-sided drawings of a frame body, FIG. 6(a) being a top plan view thereof, FIG. 6(b) a cross-sectional view taken along a line B-B in FIG. 6(a), and FIG. 6(c) a bottom plan view of the frame body.
Figure 7:
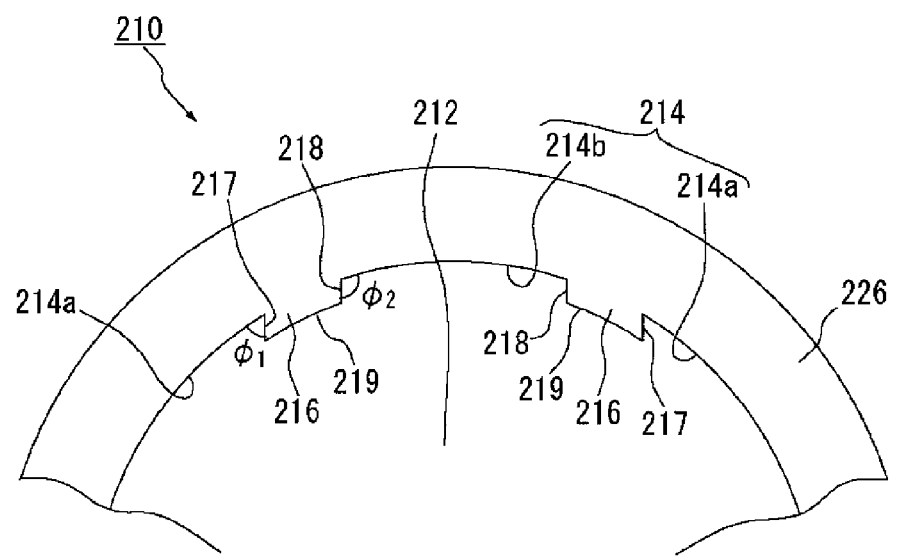
FIG. 7 is an enlarged fragmentary drawing of FIG. 6(a)

FIGS. 6(a) to 6(c) are three-sided drawings of the frame body 210, FIG. 6(a) being a top plan view thereof, FIG. 6(b) being a cross-sectional view taken along a line B-B in FIG. 6(a), and FIG. 6(c) being a bottom plan view of the frame body 210. FIG. 7 is an enlarged fragmentary drawing of FIG. 6(a).

Figure 8:
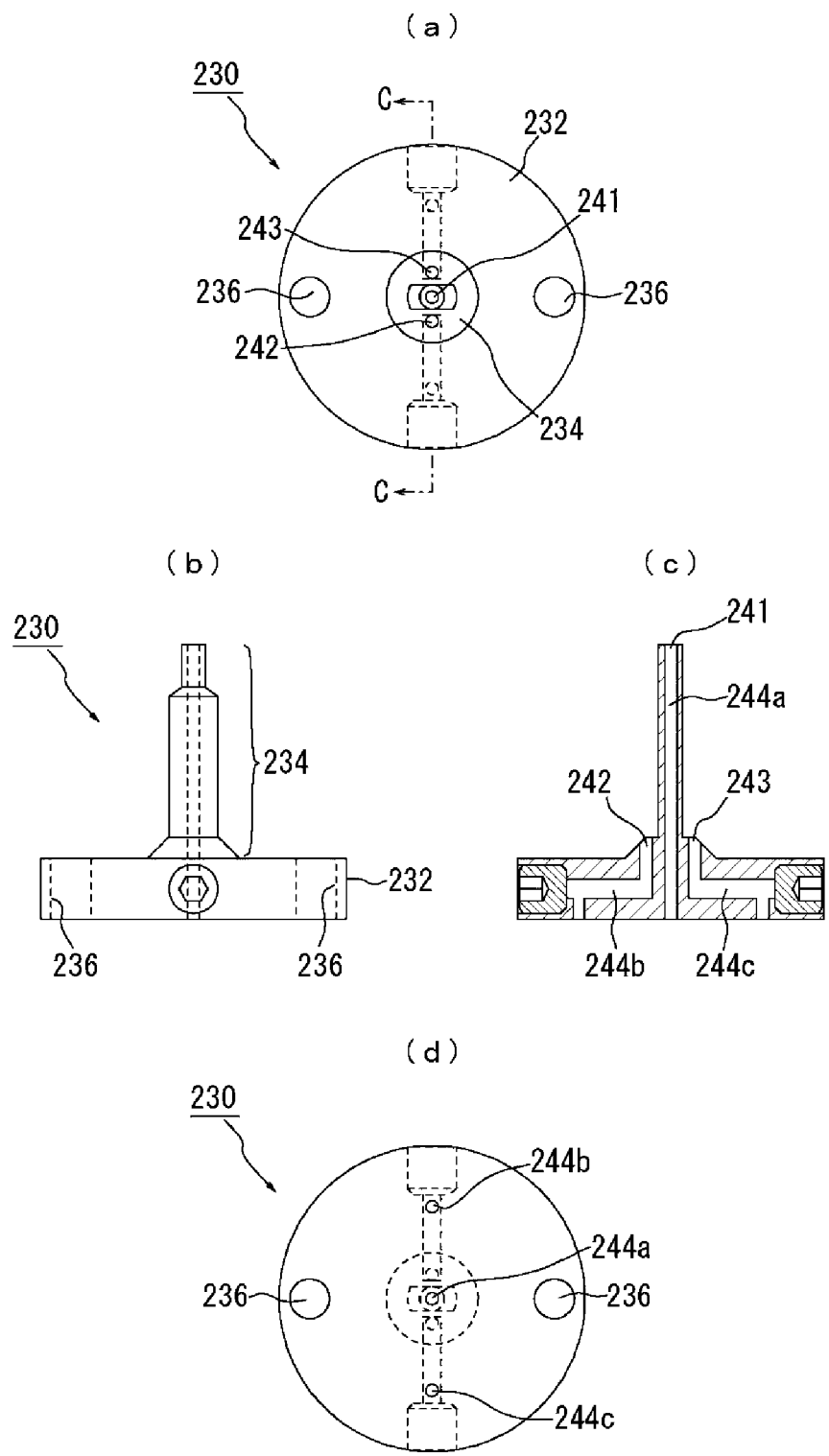
FIGS. 8(a) to 8(d) are four-sided drawings of a nozzle unit, FIG. 8(a) being a top plan view thereof, FIG. 8(b) a front view thereof, FIG. 8(c) a cross-sectional view taken along a line C-C in FIG. 8(a), and FIG. 8(d) a bottom plan view of the nozzle unit.

FIGS. 8(a) to 8(d) are four-sided drawings of the nozzle unit 230, FIG. 8(a) being a top plan view thereof, FIG. 8(b) a front view thereof, FIG. 8(c) a cross-sectional view taken along a line C-C in FIG. 8(a), and FIG. 8(d) a bottom plan view of the nozzle unit 230.

General description will be given on the resin molding apparatus 200 according to this embodiment, and the neck molding die 202 constituting a part of the resin molding apparatus 200.

The neck molding die 202 serves to retain the hollow molded body 10 including the closed-bottom cylindrical main body 12 and the cylindrical open neck portion 20, the open neck portion 20 including the helical ridge portion 22 formed on an outer circumferential surface thereof and divided by the slit 24 extending in an axial direction of the open neck portion 20, for overmolding the resin sheathing body 30 (see FIG. 1) on the outer surface of the main body 12.

The frame body 210 retains the hollow molded body 10 which serves as the inner shell, and also hides therein the open neck portion 20 to thereby expose the main body 12 for overmolding the resin sheathing body 30 (see FIG. 1). The frame body 210 is of a block shape, and includes a recess (first recess 212) in which the open neck portion 20 is to be covered, a second recess 220 to which the holder 260 is to be attached, and a third recess 222 on which the nozzle unit 230 is to be mounted. The first recess 212 is provided on an upper face side of the frame body 210 (upper position based on the orientation of FIG. 4) in a small diameter, and the third recess 222 is provided on a lower face side of the frame body 210 (lower position in FIG. 4) in a large diameter. The second recess 220 is provided between the first recess 212 and the third recess 222, in an intermediate diameter. Thus, the diameter becomes smaller in the order of the third recess 222, the second recess 220, and the first recess 212.

As shown in FIGS. 6(a) to 6(c), the frame body 210 includes the first recess 212 in which the open neck portion 20 is to be fitted, and a rib 216 formed in a convex shape on an inner circumferential surface of the first recess 212 (recess inner surface 214) so as to extend in a depthwise direction of the first recess 212 and to be engaged with the slit 24.

The frame body 210 according to this embodiment includes four of such ribs 216, which is the same as the number of the slits 24 formed on the neck circumferential surface 28, at positions respectively corresponding thereto. The ribs 216 each linearly extend in the depthwise direction of the first recess 212.

More specifically, a plurality of segments (four) of the ribs 216 are symmetrically located with respect to a symmetry plane SY passing the center of the first recess 212. Lateral faces 217, 218 of the ribs 216 are formed such that an extension of each lateral face becomes orthogonal to the symmetry plane SY.

In other words, the direction in which the rib 216 is erected from the recess inner surface 214 is directed to the normal of the symmetry plane SY. However, it is not mandatory that the heightwise direction of the rib 216 strictly agrees with the normal of the symmetry plane SY.

FIG. 7 is an enlarged drawing of a vicinity of the rib 216 in FIG. 6(a). As shown in FIG. 7, the resin molding apparatus 200 (frame body 210) according to this embodiment includes the plurality of segments of ribs 216 formed at irregular intervals on the recess inner surface 214, and the recess inner surface 214 includes a longer circumferential region 214a, and a shorter circumferential region 214b where an interval between adjacent ribs 216 is narrower than an interval between adjacent ribs 216 in the longer circumferential region 214a.

An angle $\phi_1$ defined by the lateral face 217 of the ribs 216 located on the respective sides of the longer circumferential region 214a and the recess inner surface 214 (longer circumferential region 214a) is smaller than an angle $\phi_2$ defined by the lateral face 218 of the ribs 216 located on the respective sides of the shorter circumferential region 214b and the recess inner surface 214 (shorter circumferential region 214b).

Thus, the angle $\phi_2$ between the lateral face 218 on one end portion of the rib 216 and the recess inner surface 214 (shorter circumferential region 214b) is an obtuse angle, and the angle $\phi_1$ between the lateral face 217 on the other end portion of the rib 216 and the recess inner surface 214 (longer circumferential region 214a) is an acute angle.

The lateral faces 217, 218 of the rib 216 located between the shorter circumferential region 214b and the longer circumferential region 214a extend toward a point closer to the longer circumferential region 214a, rather than toward the center of the first recess 212.

Also, the upper face 219 of the rib 216 is of a concave shape parallel to the recess inner surface 214.

Here, the angle $\phi_1$ or $\phi_2$ between the lateral face 217, 218 of the rib 216 and the recess inner surface 214 may be defined as an angle between a center line of the rib 216 and the recess inner surface 214, on a cross-sectional plane orthogonal to the depthwise direction of the first recess 212. Based on this concept, the angles $\phi_1$ and $\phi_2$ p can be defined even in the case where the lateral face 217, 218 of the rib 216 is uneven or where a boundary between the lateral face 217, 218 and the recess inner surface 214 is formed in a curved shape.

The first recess 212 includes a spot-faced portion 226. The spot-faced portion 226 is formed in a larger diameter than the first recess 212 so that the boss 15 of the open neck portion 20 can be fitted therein, and is covered with the flange portion 14 (see FIG. 4).

On a bottom portion of the third recess 222 of the frame body 210, screw holes 224 are provided for fixing the nozzle unit 230. In this embodiment, two pairs (four) of screw holes 224 are provided at symmetrical positions with respect to the first recess 212. The screw holes 224 in each of the opposing pairs of screw holes are located so as to define an angle of 45 degrees with respect to the first recess 212.

As shown in FIGS. 8(a) to 8(d), the nozzle unit 230 is a device that includes a flange portion 232 to be fitted in the third recess 222 and a nozzle element 234 sticking out from the flange portion 232. The nozzle element 234 is inserted inside the open neck portion 20 of the hollow molded body 10 attached to the frame body 210, to thereby supply a fluid into the hollow molded body 10.

To a lower side of the nozzle unit 230, a fluid supplier (not shown) is connected for supplying the fluid into the hollow molded body 10 through flow channels 244a to 244c.

Accordingly, the resin molding apparatus 200 according to this embodiment further includes the flow channels 244a to 244c communicating between an internal region and an external region of the first recess 212, and the fluid supplier (not shown) that supplies the fluid into the hollow molded body 10 fitted to the first recess 212, through the flow channels 244a to 244c.

To be more specific, the nozzle element 234 includes a distal opening 241 located on a distal end portion thereof, and two base openings 242, 243 located on a base portion thereof. The distal opening 241, and the base openings 242, 243 communicate with the lower face of the flange portion 232 through the flow channels 244a to 244c, respectively.

The flow channel 244a is open at a central position of the lower face of the flange portion 232. The flow channels 244b and 244c are open at a position close to a peripheral edge of the lower face of the flange portion 232.

The fluid to be supplied may be a gas or a liquid, and the material and pressure of the fluid are not specifically limited.

In this embodiment, the fluid to be supplied into the hollow molded body 10 is exemplified by pressurized air, and the fluid supplier by a pressure pump. The pressurized air may be defined as air of a higher pressure than the atmospheric pressure, to be supplied into the hollow molded body 10 through the distal opening 241 of the nozzle element 234. Also, the internal pressure in the hollow molded body 10 can be adjusted by discharging the pressurized air through the base opening 242, 243 of the nozzle element 234.

The nozzle unit 230 according to this embodiment is mounted in the frame body 210 such that the nozzle element 234 is located along the axial center of the first recess 212. Such configuration prevents the airflow from exerting a side force on the hollow molded body 10 when the pressurized air is supplied into the hollow molded body 10 through the distal opening 241 of the nozzle element 234, thereby assuring the retaining effect of the ribs 216 with respect to the open neck portion 20.

In the nozzle unit 230 according to this embodiment, the base openings 242, 243 are symmetrically located with respect to the distal opening 241. Such configuration suppresses emergence of a side force that may be exerted on the hollow molded body 10, when the pressurized air is discharged through the base openings 242, 243. Such advantage can be equally attained in the case of supplying a gas or a liquid into the hollow molded body 10 through the base openings 242, 243.

Pressurizing the inside of the hollow molded body 10 prevents the hollow molded body 10 from being deformed by a molding pressure in the overmolding process.

The timing for pressurizing the inside of the hollow molded body 10 is not specifically limited, it is preferable that the pressurization has been completed at the moment that the molding pressure of the molten resin becomes maximal. However, while pressurizing the inside of the hollow molded body 10, it is preferable to prevent the hollow molded body 10 attached to the frame body 210 from lifting therefrom so that the engagement between the ribs 216 and the open neck portion 20 might not become insufficient. And while the pressurizing, it is also preferable to prevent a gap from being formed between the flange portion 14 of the hollow molded body 10 attached to the frame body 210 and the spot-faced portion 226 so that the molten resin might not intrude through such a gap.

Accordingly, it is preferable to execute the pressurization of the inside of the hollow molded body 10 during a period between start of injection of the molten resin over the main body 12 of the hollow molded body 10 and the time when the molding pressure becomes maximal.

Here, a liquid may be supplied into the hollow molded body 10 instead of or in addition to the pressurized gas, to thereby temporarily reduce a deformation volume of the hollow molded body 10.

Also, aspirating the air from the inside of the hollow molded body 10 through the nozzle element 234 so as to create a negative pressure therein, with the hollow molded body 10 being air-tightly sealed with the closer 250 to be subsequently described, leads to an increase in holding force of the frame body 210 with respect to the hollow molded body 10.

The flange portion 232 includes a pair of orifices 236 penetrating therethrough in a thicknesswise direction, and symmetrically located with respect to the nozzle element 234. The orifice 236 serves as a bolt hole in combination with the screw hole 224 of the frame body 210.

Figure 10:
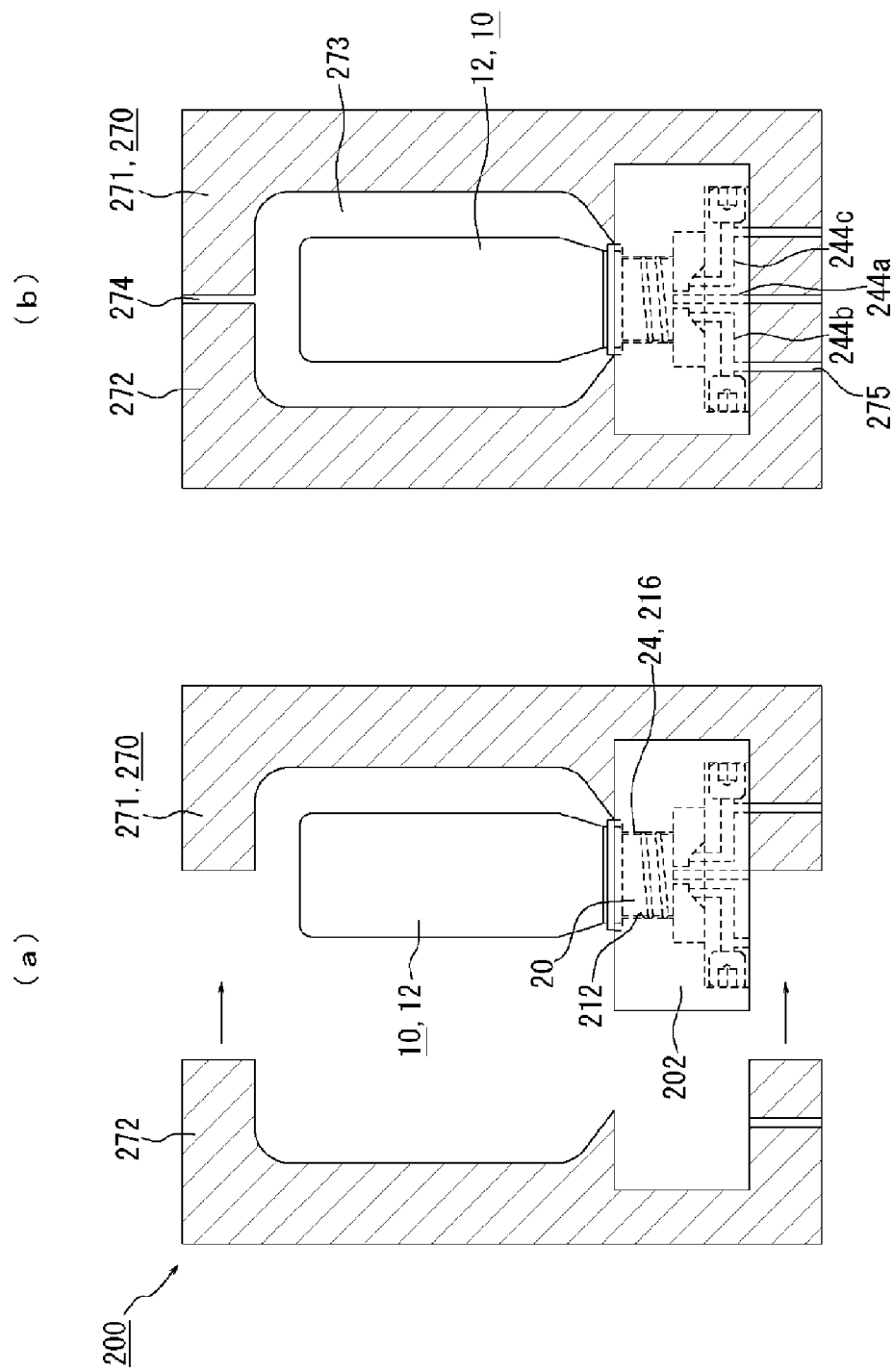
FIGS. 10(a) and 10(b) are schematic drawings for explaining each process of a resin molding method according to the embodiment.
Figure 11:
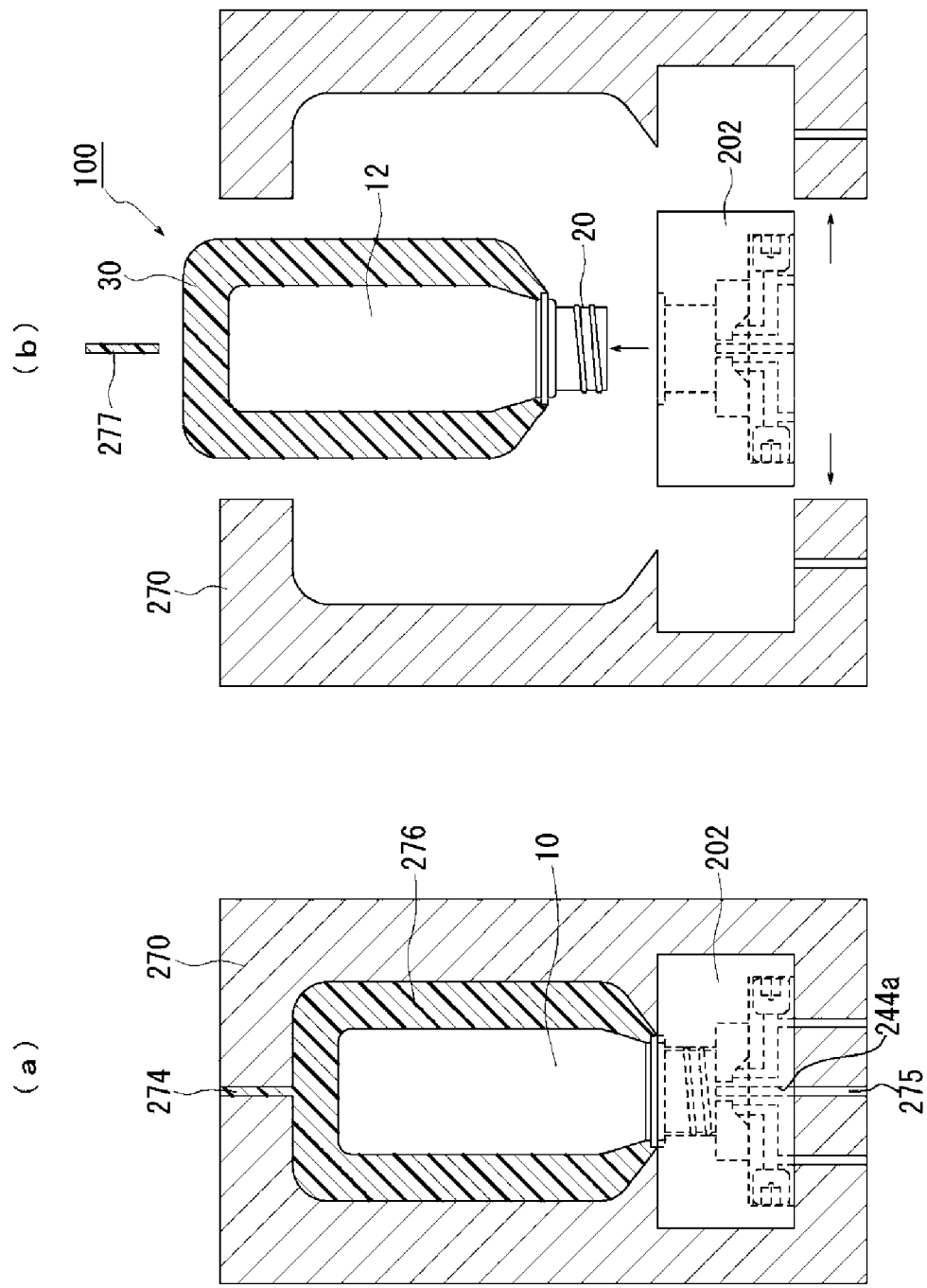
FIGS. 11(a) and 11(b) are schematic drawings for explaining each process of the resin molding method according to the embodiment.

The nozzle unit 230 is fixed with respect to the entirety of the resin molding apparatus 200 including an outer die 270 (see FIG. 10) to be subsequently described that covers the main body 12 of the hollow molded body 10 attached to the frame body 210, and the fluid supplier.

Accordingly, the frame body 210 is rotatable with respect to the nozzle unit 230, and hence the location of the slit 24 to be set is variable with respect to the nozzle unit 230 and the outer die 270, in the circumferential direction of the first recess 212.

In this embodiment, more specifically, the frame body 210 is fixed with respect to the entirety of the resin molding apparatus 200 at two rotational positions (first position and second position).

The closer 250 is a cylindrical member made of a metal, and serves to air-tightly seal between the hollow molded body 10 accommodating therein the nozzle element 234 and the frame body 210. The closer 250 includes, as shown in FIG. 4, an upper opening 252 around which an O-ring 256 is to be attached, and a base portion 254 to be brought into contact with the flange portion 232 of the nozzle unit 230 to thereby hold the base portion of the nozzle element 234.

The O-ring 256 serves to achieve air-tight contact with the opening edge of the open neck portion 20 attached to the frame body 210.

The holder 260 is a cylindrical member made of a metal, placed in the second recess 220 of the frame body 210, and serves to hold and fix the closer 250 to the flange portion 232 of the nozzle unit 230. The holder 260 includes a circular groove 262 formed in a larger diameter than the closer 250 on its lower face to be in contact with the flange portion 232. To the circular groove 262, an O-ring 266 is fitted as shown in FIG. 4. The O-ring 266 serves as an air-tight seal between the holder 260 and the flange portion 232.

The holder 260 includes a neck portion 268 of a reduced diameter, to which the base portion 254 of the closer 250, held by the holder 260, enters into air-tight contact.

Such a structure provides a sealing effect between the flange portion 232 of the nozzle unit 230 and the open neck portion 20 of the hollow molded body 10 attached to the frame body 210.

FIGS. 9(a) to 9(c) are enlarged cross-sectional views taken along a line IX-IX in FIG. 4, showing a state where the open neck portion 20 of the hollow molded body 10 is fitted in the first recess 212 of the frame body 210. FIG. 9(a) depicts a state of the retained hollow molded body 10, where the slit 24 of the open neck portion 20 is engaged with the rib 216 of the frame body 210. FIG. 9(b) is an enlarged view of the vicinity of the rib 216. The neck circumferential surface 28 and the upper face 219 of the rib 216 are spaced with a predetermined clearance. FIG. 9(c) depicts a state where the hollow molded body 10 has thermally expanded in the overmolding process. The neck circumferential surface 28 and the upper face of the rib 216 have come closer to each other.

The open neck portion 20 is subjected to heat transmitted from the molten resin to the main body 12 and then to the open neck portion 20, in the overmolding process. In contrast, the frame body 210 with the rib 216, as well as the nozzle unit 230, is normally cooled, and thermal expansion on the part of the frame body 210 is negligible.

As shown in FIGS. 3(a), 3(b) and 7, on the part of the open neck portion 20, the end portion 27a of the longer helical segment 26a of the ridge portion 22 rises more steeply from the neck circumferential surface 28 than the end portion 27b of the shorter helical segment 26b. On the part of the rib 216 of the frame body 210, the lateral face 217 located on the respective sides of the longer circumferential region 214a rises in an acuter angle from the recess inner surface 214 than the lateral face 218 located on the respective sides of the shorter circumferential region 214b.

Figure 9:
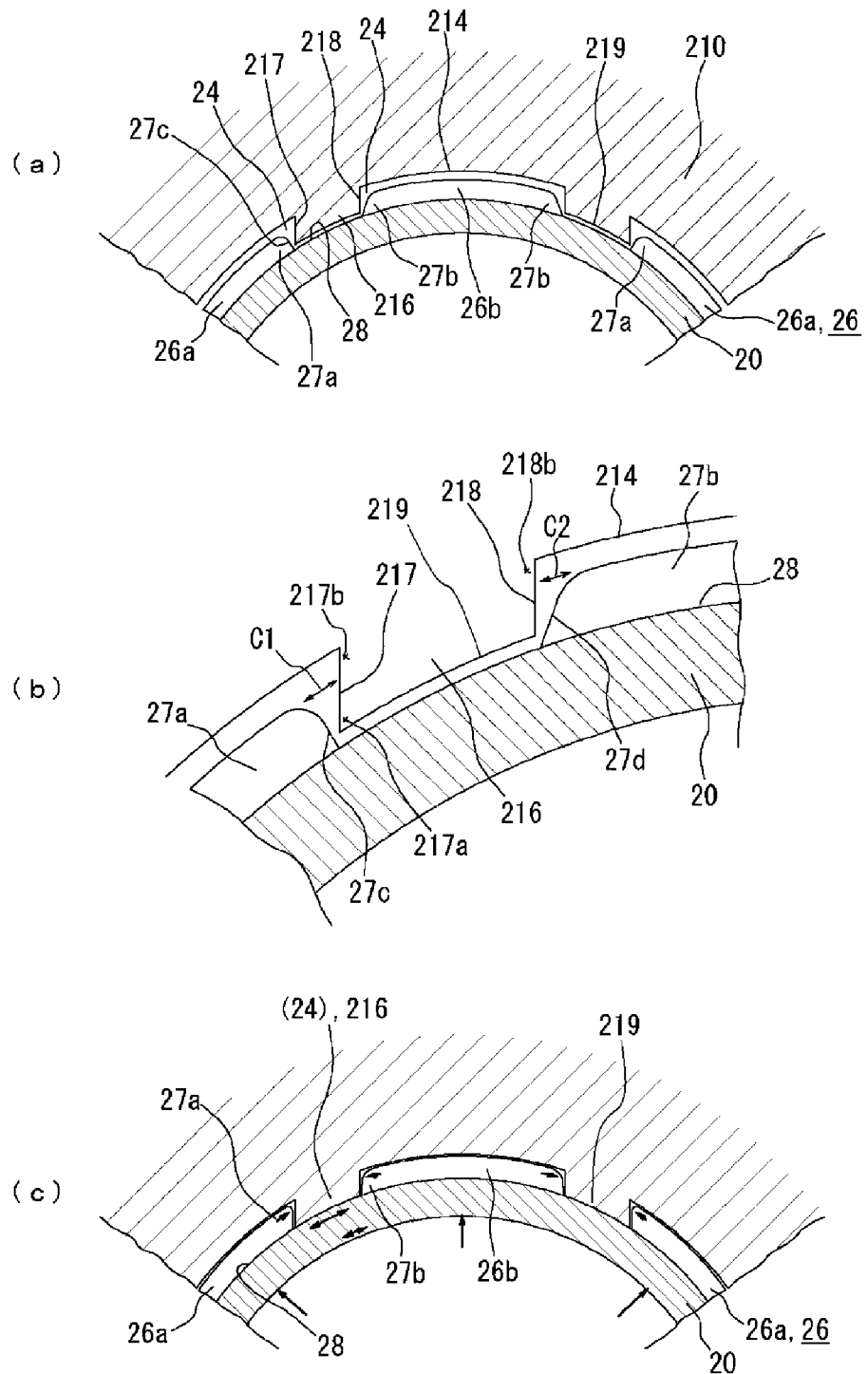
FIGS. 9(a) to 9(c) are cross-sectional views taken along a line IX-IX in FIG. 4, FIG. 9(a) showing a state where the hollow molded body is retained, FIG. 9(b) being an enlarged view of a portion close to a rib, and FIG. 9(c) showing a state where the hollow molded body has thermally expanded.

Accordingly, as shown in FIG. 9, upon engaging the rib 216 with the slit 24, the end portion 217a of the lateral face 217 of the rib 216 opposes a rising wall (slope 27c) of the end portion 27a of the longer helical segment 26a, in a deep angle. Accordingly, the engagement between the helical segments 26 and the rib 216 is firmly made at the portion between the slope 27c of the longer helical segment 26a and the end portion 217a of the lateral face 217.

In contrast, since the angle $\phi_1$ between the lateral face 217 and the recess inner surface 214 (see FIG. 7) is acute, the base portion 217b of the lateral face 217, on the side of the recess inner surface 214, is largely spaced from the end portion 27a, by a clearance C1.

On the other hand, regarding the end portion 27b of the shorter helical segment 26b and the lateral face 218, the angle $\phi_2$ between the lateral face 218 and the recess inner surface 214 (see FIG. 7) is obtuse, and hence the lateral face 218 opposes the rising wall (slope 27d) of the end portion 27b in a relatively shallow angle. In other words, the angle between the lateral face 218 and the slope 27d is smaller than the angle between the lateral face 217 and the slope 27c. Also, the base portion 218b of the lateral face 218 on the side of the recess inner surface 214 is spaced from the end portion 27b by a predetermined clearance C2.

Now, in this embodiment, in the state where the rib 216 between the longer circumferential region 214a and the shorter circumferential region 214b is engaged with the slit 24 as shown in FIGS. 9(a) to 9(c), the clearance C1 between the base portion 217b of the lateral face 217 of the rib 216 on the side of the longer circumferential region 214a and the helical segment 26 (longer helical segment 26a) is larger than the clearance C2 between the base portion 218b of the lateral face 218 of the rib 216 on the side of the shorter circumferential region 214b and the helical segment 26 (shorter helical segment 26b).

In other words, in this embodiment the clearances C1, C2 between the base portion of the lateral faces 217, 218 of the rib 216 and the end portion 27a, 27b of the helical segment 26 are larger on the side of the longer circumferential region 214a and the longer helical segment 26a (end portion 27a) (C1), and smaller on the side of the shorter circumferential region 214b and the shorter helical segment 26b (end portion 27b) (C2).

With the foregoing configuration in the resin molding apparatus 200 according to this embodiment, abutting pressure of the helical segment 26 against the rib 216 created by the thermal expansion of the open neck portion 20, hence the helical segments 26, can be equilibrated on the respective lateral faces 217, 218.

When the open neck portion 20 is heated, the open neck portion 20 and the helical segments 26 are subjected to thermal expansion in a direction indicated by arrows in FIG. 9(c). Then the open neck portion 20 expands as a whole resulting in an increase in circumferential length, which leads to an increase in interval between the helical segments 26, hence in width of the slit 24.

On the other hand, on the side of the outer circumference of the end portions 27a, 27b of the helical segments 26 (longer helical segment 26a, shorter helical segment 26b), the thermal expansion acts in a direction to make the slit 24 narrower, as indicated by the arrows. This is because the outer circumferential edge of the end portions 27a, 27b is a free end, which is free from a restraining force in the circumferential direction.

Accordingly, in the case where the open neck portion 20 is heated, the helical segments 26 extend in both ways in the circumferential direction, and the end portions 27a, 27b may dig into the lateral faces 217, 218 of the rib 216.

Here, the thermal expansion of the helical segments 26 in the circumferential direction becomes more prominent when the helical segments 26 are longer in the circumferential direction. Therefore, the thermal expansion in the direction to reduce the clearance C1 at the end portion 27a of the longer helical segment 26a appears more prominently than at the end portion 27b of the shorter helical segment 26b.

However, the frame body 210 and the hollow molded body 10 according to this embodiment are configured, as stated above, such that the clearance C1 between the base portion of the lateral face 217 of the rib 216 and the end portion 27a becomes larger than the clearance C2 between the lateral face 218 and the end portion 27b.

Accordingly, the abutting pressure between the helical segments 26 and the lateral faces 217, 218 can be equilibrated on the respective sides of the ribs 216, and therefore the digging effect can be generally suppressed.

The foregoing configuration allows the resin container 100 to be removed from the frame body 210 before the hollow molded body 10 heated up in the overmolding process is sufficiently cooled. Consequently, employing the hollow molded body 10 and the resin molding apparatus 200 according to this embodiment enables upgrading the throughput of the overmolding process, an object proper to the present invention.

[Resin Molding Method]

FIGS. 10(a) to 11(b) are explanatory drawings showing a process of the resin molding method according to this embodiment.

First, general description will be given on the resin molding method according to this embodiment.

The method according to this embodiment is a method of molding a resin over the hollow molded body 10 including the closed-bottom cylindrical main body 12 and the cylindrical open neck portion 20, the open neck portion 20 including the helical ridge portion 22 formed on the outer circumferential surface thereof and divided by a slit 24 extending in an axial direction of the open neck portion 20, and includes overmolding the resin sheathing body 30 over the outer surface of the main body 12.

More specifically, the resin molding method according to this embodiment includes retaining the hollow molded body 10 by engaging the slit 24 with an engagement piece (rib 216), and overmolding a molten resin over the hollow molded body 10 thus retained, thereby forming the resin container 100.

Hereunder, further details of the resin molding method according to this embodiment will be described.

[Retaining Process]

FIG. 10(a) schematically shows a state where the slit 24 of the open neck portion 20 and the rib 216 are engaged, by fitting the open neck portion 20 of the hollow molded body 10 in the first recess 212 of the frame body 210. The frame body 210 constitutes the neck molding die 202, together with the nozzle unit 230, the closer 250 and the holder 260 (see FIG. 4).

FIGS. 10(a) and 10(b) are oriented such that a downward direction represents the gravity direction. Accordingly, in the retaining process the hollow molded body 10 is retained with the open neck portion 20 oriented downward, in the gravity direction.

In the retaining process, the engagement with the slit 24 is made such that the clearance C1 between the end portion of the longer helical segment 26a and the engagement piece (rib 216) becomes larger than the clearance C2 between the end portion of the shorter helical segment 26b and the engagement piece (rib 216).

The neck molding die 202 retaining the hollow molded body 10 constitutes the resin molding apparatus 200 in combination with the outer die 270 for overmolding. The outer die 270 is constituted of a combination of sectional dies 271 and 272.

FIG. 10(b) schematically shows a state where the sectional dies 271, 272 are opposingly combined with each other so as to define a cavity 273 inside the outer die 270, in which the main body 12 of the hollow molded body 10 is accommodated.

In this state, the flow channels 244a to 244c of the nozzle unit 230 each communicate with outside of the outer die 270. In other words, the outer die 270 includes channels 275 respectively communicating with the distal opening 241 and the base openings 242, 243 of the neck molding die 202.

At an upper portion of the cavity 273, a resin inlet path 274 communicating with outside of the outer die 270 is provided for supplying the molten resin therethrough.

FIG. 11(a) schematically shows a state where the molten resin 276 has been supplied into the cavity 273 through the resin inlet path 274. In this state, pressurized air is supplied into the hollow molded body 10 from outside of the outer die 270, through the channel 275 and the flow channel 244a.

The molten resin 276 introduced into the cavity 273 is accumulated in the cavity 273, while pressing the hollow molded body 10 in the gravity direction.

In the outer die 270 according to this embodiment, the resin inlet path 274 is located on the central axis of the hollow molded body 10. Accordingly, the hollow molded body 10 retained by the neck molding die 202 is kept from tilting with respect to the cavity 273.

FIG. 11(b) schematically shows a state where the molten resin 276 has been cooled and cured. The molten resin 276 has been cured and now constitutes the resin sheathing body 30.

Upon cutting off the runner 277, the overmolding process is completed and the resin container 100 with the resin sheathing body 30 unified with the hollow molded body 10 overmolded on the main body 12 is obtained.

The resin container 100 thus formed can be taken out by linearly drawing the open neck portion 20 out of the first recess 212 of the molding die 202 in the axial direction.

Advantageous effects offered by the resin molding apparatus 200 and the resin container 100 according to this embodiment will be described hereunder.

The resin container 100 according to this embodiment includes the slit 24 formed on the open neck portion 20 so as to extend in the axial direction thereof, and to divide the ridge portion 22 into the plurality of helical segments 26. The resin container 100 thus configured provides high molding efficiency, hence a high throughput. To be more specific, since the hollow molded body 10 can be fixed to the neck molding die 202 utilizing the slit 24 as a key groove, the hollow molded body 10 can be set in the first recess 212 in a desired orientation with high reproducibility, simply by dropping the open neck portion 20 into the first recess 212 of the neck molding die 202, without rotating the hollow molded body 10.

The cap 40 according to this embodiment includes the threaded portion 42 continuously formed at least in one entire loop, for engagement with the plurality of helical segments 26. Such configuration inhibits, in the resin container 100 including the slit 24 formed on the open neck portion 20, communication between outside and inside of the hollow molded body 10, once the cap 40 is attached. Therefore, in the case where the content of the hollow molded body 10 is a volatile liquid, the content can be prevented from evaporating, even though the cap 40 is imperfectly attached to the open neck portion 20.

The helical segments 26 according to this embodiment includes the longer helical segment 26a, which are longer in the circumferential direction of the open neck portion 20, and the shorter helical segment 26b which are shorter, and the respective end portions of the longer helical segment 26a in the circumferential direction rise more steeply than the end portions of the shorter helical segment 26b in the circumferential direction. Such configuration improves molding performance with the divided sectional dies 16a, 16b (see FIG. 2(a)), in the overmolding process on the hollow molded body 10 that employs the sectional dies 16a, 16b. Also, in the case of forming the hollow molded body 10 by blow molding, designing the molding die such that the parting line coincides with the imaginary splitting plane SP can prevent interference between a protruding portion on the molding die corresponding to the slit 24 and the helical segment 26, thereby preventing what is known as undercut. In other words, the foregoing configuration provides the hollow molded body 10 having the structure that offers high molding efficiency.

The resin molding apparatus 200 according to this embodiment includes the first recess 212 in which the open neck portion 20 is to be fitted, and the ribs 216 formed on the recess inner surface 214 in the depthwise direction thereof, so as to be engaged with the slit 24. Such configuration allows the open neck portion 20 to be fitted in the frame body 210 by the engagement of the slit 24 and the rib 216, simply by inserting the open neck portion 20 of the hollow molded body 10 into the first recess 212, and to be positioned in a predetermined orientation with respect to the frame body 210, with high reproducibility. Thus, the configuration that allows the open neck portion 20 to be set in the frame body 210 without the need to rotate, despite the hollow molded body 10 including the helical ridge portion 22 formed thereon, facilitates realizing full automation of the overmolding process utilizing a work robot.

The neck molding die 202 constituting a part of the resin molding apparatus 200 includes the plurality of segments of ribs 216 formed at irregular intervals on the recess inner surface 214, which includes the longer circumferential region 214a and the shorter circumferential region 214b, and the angle $\phi_1$ defined by the lateral face 217 of the ribs 216 located on the respective sides of the longer circumferential region 214a and the longer circumferential region 214a is smaller than the angle $\phi_2$ defined by the lateral face 218 of the ribs 216 located on the respective sides of the shorter circumferential region 214b and the shorter circumferential region 214b.

Such configuration assures effective engagement between the end portion 27a of the longer helical segment 26a and the lateral face 217 of the rib 216, and allows the hollow molded body 10 to be accurately positioned in the first recess 212 of the neck molding die 202.

This is because the foregoing configuration of the neck molding die 202 creates, in combination with the configuration on the part of the hollow molded body 10 that provides high molding efficiency, the state where the rising angle $\phi_1$, $\phi_2$ of the lateral faces 217, 218 of the rib 216 constitute supplementary angles with respect to the rising angle $\theta_1$, $\theta_2$ of the respective end portions of the longer helical segment 26a and the shorter helical segment 26b in the circumferential direction.

In the resin molding apparatus 200 according to this embodiment, the clearance C1 between the lateral face 217 and the end portion 27a on the side of the base portion of the rib 216 is larger than the clearance C2 between the lateral face 218 and the end portion 27b. Accordingly, even though prominent thermal expansion of the longer helical segment 26a is caused because of the heat transmitted to the hollow molded body 10 in the overmolding process, the digging effect of the helical segments 26 into the lateral faces 217, 218 on the respective sides of the rib 216 can be suppressed by equilibrating the abutting pressure. Such configuration allows the resin container 100 to be quickly removed from the first recess 212, which contributes to improving a high throughput.

The plurality of (four) segments of ribs 216 is symmetrically provided with respect to the symmetry plane SY passing the center of the first recess 212, and the lateral faces 217, 218 of the rib 216 are extending oriented to the symmetry plane SY. Such configuration increases retention stability of the open neck portion 20 fitted in the first recess 212.

The resin molding apparatus 200 according to this embodiment further includes the outer die 270 that covers the main body 12 of the hollow molded body 10 retained therein, and the position of the slit 24 to be set is variable with respect to the outer die 270 in the circumferential direction of the first recess 212. Such configuration allows the angle between the hollow molded body 10 corresponding to the inner shell and the resin sheathing body 30 corresponding to the outer shell to be adjusted as desired. With such configuration, for example, in the case where the hollow molded body 10 and the resin sheathing body 30 are of a shape having a polygonal cross-section, a container of a characteristic design can be formed by changing the angle of the hollow molded body 10 and the resin sheathing body 30 about the axis.

The resin molding apparatus 200 according to this embodiment includes the flow channels 244a to 244c communicating with the outside and inside of the first recess 212, and the fluid supplier (not shown) that supplies a fluid into the hollow molded body 10 fitted in the first recess 212, through the flow channels 244a to 244c. Such configuration allows supplying a pressurized gas or a liquid into the hollow molded body 10 in the overmolding process. Therefore, compressive deformation of the hollow molded body 10 due to the mold pressure can be prevented, which assures tight adhesion of the hollow molded body 10 and the resin sheathing body 30.

Advantageous effects of the resin molding method according to this embodiment will be described hereunder.

The resin molding method according to this embodiment includes retaining the hollow molded body 10 by engagement with the slit 24, and overmolding a molten resin over the hollow molded body 10 thus retained, thereby forming the resin container 100. The method allows the hollow molded body 10 to be retained by the engagement with the slit 24, despite that the helical ridge portion 22 is present on the open neck portion 20 of the hollow molded body 10, thereby eliminating the need to screw the hollow molded body 10 into the resin molding apparatus 200. Also, since the engagement with the slit 24 is the method for retaining the hollow molded body 10, the hollow molded body 10 can be oriented in a desired direction, when overmolding the resin sheathing body 30 on the hollow molded body 10.

In the retaining process, the hollow molded body 10 is retained with the open neck portion 20 oriented downward in the gravity direction. Accordingly, the hollow molded body 10 is stably retained in the first recess 212 because of its self weight, and can hence be prevented from tilting with respect to the cavity 273 of the outer die 270.

In the retaining process, the engagement with the slit 24 is made such that the clearance C1 between the end portion of the longer helical segment 26a and the rib 216 becomes larger than the clearance C2 between the end portion of the shorter helical segment 26b and the end portion 27b. Accordingly, the longer helical segment 26a can be prevented from digging into the slit 24 engaged therewith, even in the case where the helical segments 26 are heated up and the longer helical segment 26a thermally expands prominently in the overmolding process. Such arrangement allows the resin container 100 formed through the overmolding process to be quickly removed from the first recess 212, thereby achieving a high throughput.

The invention claimed is:

1. A method of molding a resin over a hollow molded body made of a resin including a closed-bottom cylindrical main body and a cylindrical open neck portion, said open neck portion including a helical ridge portion formed on an outer circumferential surface thereof and divided into a plurality of helical segments by a slit extending in an axial direction of said open neck portion, said helical segments including a longer helical segment and a shorter helical segment, wherein the longer helical segment is longer in a circumferential direction of said open neck portion than the shorter helical segment, said method including overmolding a resin sheathing body over an outer surface of said main body, comprising:

retaining said hollow molded body by engaging said slit with an engagement piece; and overmolding a molten resin over said hollow molded body thus retained;

wherein said retaining said hollow molded body includes engaging said slit with said engagement piece such that a clearance "between an end portion of said longer helical segment and said engagement piece is larger than a clearance between an end portion of said shorter helical segment and said engagement piece".

2. The method according to claim 1, wherein said retaining said hollow molded body includes directing said open neck portion downward in the gravity direction.

* * * * *